United States Patent
Isaacs et al.

(10) Patent No.: US 9,355,354 B2
(45) Date of Patent: May 31, 2016

(54) EMBEDDED MULTI-CHANNEL KNOWLEDGEBASE

(75) Inventors: Charlie Isaacs, San Jose, CA (US); Robert L. Arseneault, Manchester, NH (US)

(73) Assignee: VERINT AMERICAS INC., Alpharetta, GA (US)

( * ) Notice: Subject to any disclaimer, the term of this patent is extended or adjusted under 35 U.S.C. 154(b) by 633 days.

(21) Appl. No.: 12/032,306

(22) Filed: Feb. 15, 2008

(65) Prior Publication Data

US 2009/0210473 A1 Aug. 20, 2009

(51) Int. Cl.

| | |
|---|---|
| *G06F 15/16* | (2006.01) |
| *G06N 5/02* | (2006.01) |
| *H04L 12/28* | (2006.01) |
| *G06F 15/173* | (2006.01) |
| *G06F 9/455* | (2006.01) |
| *G06Q 30/00* | (2012.01) |

(52) U.S. Cl.
CPC ............ *G06N 5/022* (2013.01); *H04L 12/2814* (2013.01); *G06F 15/17325* (2013.01); *G06F 2009/45591* (2013.01); *G06Q 30/016* (2013.01)

(58) Field of Classification Search
USPC ......................................................... 709/226
See application file for complete search history.

(56) References Cited

U.S. PATENT DOCUMENTS

| | | | |
|---|---|---|---|
| 6,742,141 B1* | 5/2004 | Miller | G06F 11/0748 706/45 |
| 2002/0049738 A1* | 4/2002 | Epstein | 707/1 |
| 2002/0076031 A1* | 6/2002 | Falcon et al. | 379/265.11 |
| 2002/0087882 A1* | 7/2002 | Schneier | G06F 21/552 726/23 |
| 2004/0012808 A1* | 1/2004 | Payne et al. | 358/1.15 |
| 2005/0015678 A1* | 1/2005 | Miller | 714/38 |
| 2005/0096785 A1* | 5/2005 | Moncrief | G06F 19/327 700/241 |
| 2005/0233733 A1* | 10/2005 | Roundtree et al. | 455/414.1 |
| 2008/0052203 A1* | 2/2008 | Beyer | G06Q 10/087 705/28 |
| 2008/0228504 A1* | 9/2008 | Nguyen et al. | 705/1 |
| 2008/0307413 A1* | 12/2008 | Ferris et al. | 717/178 |
| 2009/0138599 A1* | 5/2009 | Allin | 709/226 |

\* cited by examiner

*Primary Examiner* — Andrew Goldberg
(74) *Attorney, Agent, or Firm* — Meunier Carlin & Curfman

(57) ABSTRACT

Embodiments of the present invention provide a method, system and computer program product for an embedded multi-channel knowledgebase for embedded product support. In one embodiment of the invention, an embedded multi-channel knowledgebase data processing system can be configured for embedded product support. The system can include a consumer appliance, a knowledgebase embedded in the consumer appliance, a help module disposed in the consumer appliance and programmed to provide access to the knowledgebase through the consumer appliance, and multi-channel escalation and reporting logic coupled to the help module. The logic can include program code enabled to escalate support requests in the help module from the embedded knowledgebase to a remote, communicatively coupled response manager over a computer communications network.

12 Claims, 1 Drawing Sheet

EMBEDDED MULTI-CHANNEL KNOWLEDGEBASE

BACKGROUND OF THE INVENTION

1. Field of the Invention

The present invention relates to the field of customer relationship management and more particularly to embedded technical support for a fielded product.

2. Description of the Related Art

The product lifecycle for any product involves prototyping, manufacturing, quality assurance, distribution, customer service and repair, and production updating and improvement. Customer service and repair for many products begin with documentation delivered with the product. As part of the documentation, frequently asked questions can be provided as can an index of common problems and solutions. A second level of customer service and repair, a Web site can be specified through which the customer can search for relevant information. As a third level of customer service and repair, e-mail and instant messaging can be supported through a Web site or directly as indicated in the documentation for the project. Finally, as a most intense form of customer service and repair, a telephone number can be provided with which the customer can speak with a customer service representative directly.

Despite the varying levels of support provided in distributing a product to customers, essential to the customer experience is the self-empowerment of the customer to troubleshoot common product problems without requiring the customer to interact with customer service professionals. Self-service tools have grown in popularity as a win-win solution addressing the desire of consumers to independently address product issues and the desire of manufacturers to lower the cost of supporting products in the field. Even still, the ability of individual customers to troubleshoot a product through self-service mechanisms can range from none at all to full competency. Thus, telephone accessible customer service representatives remain part and parcel of the modern product lifecycle.

To improve self-service adoption rates, increase call center efficiency and improve response accuracy, solutions are required that assist each of agents, customers, partners and suppliers in finding answers to support questions more efficiently. As a result, effective solutions to information search and retrieval have become critical to inquiry resolution. One popular approach includes deploying a search engine that allows users to sift through many information sources. Typically, search engines offer any or a combination of a keyword, simple text and natural language query interface.

While the utilization of a search engine for self-service information retrieval for inquiry resolution has become commonly understood, this approach has demonstrated significant limitations. In particular, the search engine is best suited for use by expert users who are familiar with the content and terminology being searched and who know which search words will most quickly yield a correct answer. However, users without domain expertise cannot easily apply the precision and relevance required for efficient retrieval. Most will recall the experience of entering a few keywords into a search engine only to receive a resulting set of hits numbering in the thousands.

To address the limitations of the basic search engine for information retrieval, manufacturers and distributors have turned to the knowledge management (KM) system to better manage and share information. The KM system has been defined as an "IT (Information Technology)-based system developed to support and enhance the organizational processes of knowledge creation, storage/retrieval, transfer, and application." The KM system intends to enable users access to knowledge of facts, sources of information, and solutions of an organization in the course of inquiry resolution.

The modern KM system provides a knowledgebase of articles answering questions posed by inquiring users. The inquiring users generally not only include customers, but also include customer service representatives seeking answers to customer questions. Inquiring users arrive at the desired article either by direct search engine query, through case based reasoning, or through artificial intelligence (AI) based expert modeling in which a sub-set of selected articles are presented by reference to the inquiring user as a best guess of the desired articles.

Even still, for many, access to a KM system requires broadband connectivity and a personal computer. In some environments, however, access to both broadband connectivity and a personal computer is not guaranteed—for example, in an industrial factory environment or office environment. Consequently, some products like copiers, audio and video components, factory machinery and kitchen appliances that include onboard computing and a display incorporate a help function accessible through the products. Given the complexity of KM systems, however, the limited computing resources of products does not permit the use of KM system from the product itself and the embedded help function is limited to basic, textual information.

BRIEF SUMMARY OF THE INVENTION

Embodiments of the present invention address deficiencies of the art in respect to embedded product support and provide method, system and computer program product for an embedded multi-channel knowledgebase for embedded product support. In one embodiment of the invention, an embedded multi-channel knowledgebase data processing system can be configured for embedded product support. The system can include a consumer appliance, a knowledgebase embedded in the consumer appliance, a help module disposed in the consumer appliance and programmed to provide access to the knowledgebase through the consumer appliance, and multi-channel escalation and reporting logic coupled to the help module.

The logic can include program code enabled to escalate support requests in the help module from the embedded knowledgebase to a remote, communicatively coupled response manager over a computer communications network. Additionally, an aggregator can be communicatively coupled to the consumer appliance. The aggregator can aggregate support request information in an aggregated knowledgebase accessible by multiple different communicatively coupled consumer appliances over the computer communications network. Yet further, the program code can be enabled to escalate support requests in the help module from the embedded knowledgebase to a remote, communicatively coupled response manager over a computer communications network, is further enabled to escalate support requests through a selected channel of communication selected from the group consisting of e-mail, instant messaging and voice chat.

In another embodiment of the invention, a method for embedded multi-channel escalation and reporting can be provided. The method can include receiving a support request through a consumer appliance, accessing a knowledgebase to answer the request from within the consumer appliance, and escalating the support request to a remote response manager over a selected channel through a computer communications network communicatively coupling the remote response manager to the consumer appliance. Optionally, the method also can include logging the support request over the computer communications network in an aggregated knowledgebase. Even yet further, the method can include selecting the channel from amongst an e-mail channel, an instant messaging channel and a voice chat channel according to a level of escalation.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for embedded multi-channel knowledgebase data processing system configured for embedded product support. In accordance with an embodiment of the present invention, a knowledgebase can be embedded into a computing system within a consumer appliance, such as a copier, refrigerator, cellular telephone, and the like. Multi-channel escalation and reporting logic can be coupled to the embedded knowledgebase within the consumer appliance, as well. The logic can include program code enabled to respond to a request for assistance by providing access to the knowledgebase from within a display on the consumer appliance.

Further, the program code can be enabled to escalate a response from the consumer appliance over a computer communications network to a customer service agent over a computer communications network. The escalated response can select from amongst different channels of communication ranging from e-mail to instant messaging to voice telephony. Further, the escalated response can report status information for the consumer appliance. The status information can be aggregated into a knowledgebase for many different consumer appliances. Also, the status information can include a visualization of the consumer appliance so as to permit a customer service representative to visualize a problem experienced by the customer.

Figure 1:
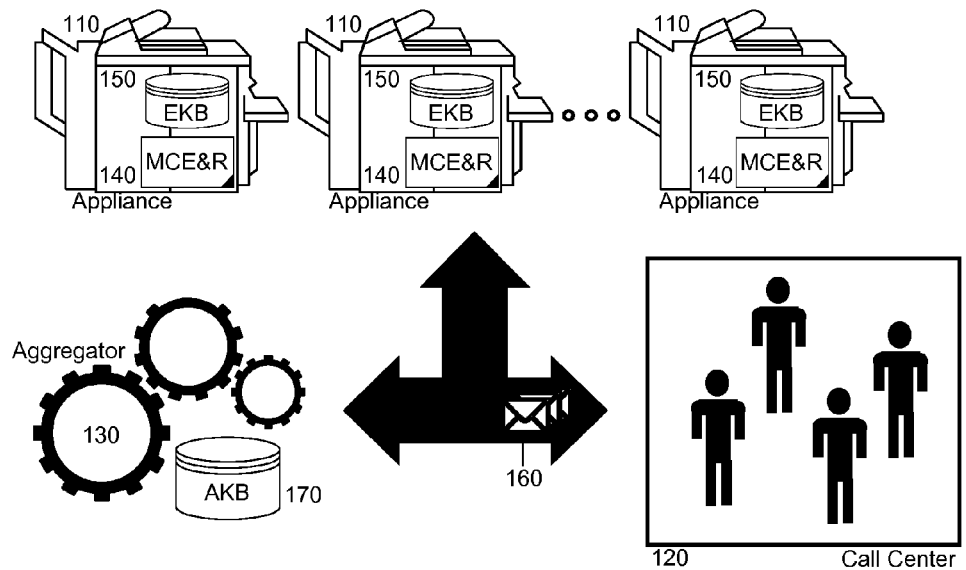
FIG. 1 is a pictorial illustration of an embedded multi-channel knowledgebase data processing system configured for embedded product support.

In further illustration, FIG. 1 pictorially shows an embedded multi-channel knowledgebase data processing system configured for embedded product support. As shown in FIG. 1, multiple different consumer appliances 110 can be provided and can include by way of example, office machines such as fax machines, copiers, telephones and the like, communications devices such as cellular telephones, kitchen appliances such as toasters, microwaves and refrigerators and factory machinery, to name several examples. Each of the consumer appliances 110 can include embedded thereon an embedded knowledgebase 150 coupled to multi-channel escalation and reporting logic 140.

The embedded knowledgebase 150 can provide a set of articles answering questions posed by inquiring users. The logic 140, in turn, can include program code enabled to select and present a relevant article for a posed question through a respective one of the consumer appliances 110. The program code of the logic 140 further can be enabled to identify a threshold of user interactivity with the embedded knowledgebase 150 beyond which an escalation can occur to a call center 120. In this regard, the escalation can include messages 160 provided to agents within the call center 120 seeking technical support.

Of note, the program code of the logic 140 also can be enabled to support reporting of customer support issues addressed through inquiries to the embedded knowledgebase 150. Specifically, an aggregator 130 can be configured to aggregate customer support issues for several different consumer appliances in an aggregated knowledge base 170. In turn, the aggregated knowledge base 170 can be accessed by the program code of the logic 140 for each of the consumer appliances 110 when escalating from providing answers from a corresponding embedded knowledgebase 150.

Figure 2:
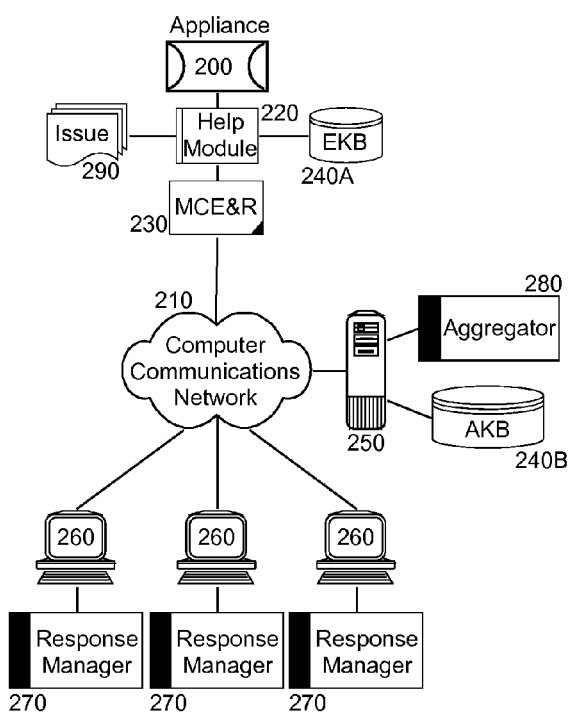
FIG. 2 is a schematic illustration of an embedded multi-channel knowledgebase data processing system configured for embedded product support; and, FIG. 3 is a flow chart illustrating a process for embedded product support utilizing an embedded multi-channel knowledgebase.

In further illustration of the structure of the embedded multi-channel knowledgebase data processing system, FIG. 2 is a schematic illustration of an embedded multi-channel knowledgebase data processing system configured for embedded product support. The system can include multiple different consumer appliances 200 communicatively coupled to a call center of computing hosts 260 supporting respective response managers 270 over computer communications network 210. (Only a single consumer appliance 200 shown for the purpose of illustrative simplicity). The response manager 270 can be configured with automated response technology (ART) as it is well-known in the art in order to provide automated responses to support requests provided through different modes of messaging including instant messaging, e-mail and chat.

Each appliance 200 can include a help module 220 coupled to an embedded knowledgebase 240A and multi-channel escalation and reporting logic 230. The embedded knowledgebase 240A can include a set of articles accessible through search mechanisms corresponding to user questions. Accordingly, the help module 220 can be configured upon invocation through the appliance 200 to navigate the embedded knowledgebase 240A to deliver articles of relevance to an inquiring end user providing a support request. The help module 220 further can be configured to invoke the logic of the multi-channel escalation and reporting logic 230 in order to escalate a support request from the embedded knowledgebase 240A to a selected one of the response managers 270 over the computer communications network 210. The escalation can include a selection of an e-mail request for support at one level, an instant messaged request for a higher level of required support and the initiation of a voice chat session for even a higher level of required support.

Notably, the logic of the multi-channel escalation and reporting logic 230 can include program code enabled to store issue records 290 for different support requests, and to report the issue records 290 to an aggregator 280 executing in a host server 250 communicatively coupled to the appliance 200 over the computer communications network 210. The aggregator 280 in turn can store the issue records 290 into an aggregated knowledgebase 240B for access by the response managers 270 when handling support requests provided by the appliances 200. Alternatively, each of the issue records 290 can be shared with peer appliances 200 in a peer-to-peer fashion. Moreover, the embedded knowledgebase 240A can be configured for direct access by peer appliances 200 and the logic of the multi-channel escalation and reporting logic 230 can be enabled to access the embedded knowledgebase 240 of other peer appliances during escalation. In this way, the collective wisdom acquired by different appliances 200 when managing support requests can be provided for the benefit of the appliances 200.

Figure 3:
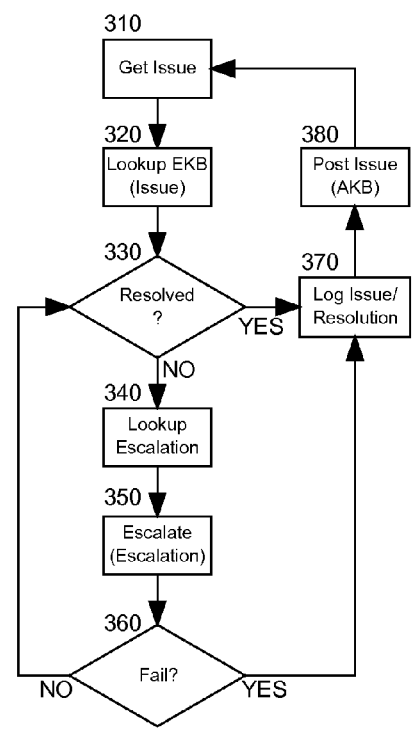

In yet further illustration of the operation of the multi-channel escalation and reporting logic 230, FIG. 3 is a flow chart illustrating a process for embedded product support utilizing an embedded multi-channel knowledgebase. The process can begin in block 310 with the retrieval of a support request in the consumer appliance. In block 320, the embedded knowledgebase in the consumer appliance can be queried against the support request for one or more relevant articles which can be provided to the querying user. In decision block 330, it can be determined whether or not the support request has been resolved to the satisfaction of the querying user. If so, in block 370 the issue for the support request and the resolution can be logged and reported to the aggregated knowledgebase in block 380. Otherwise, the process can continue through block 340.

In block 340, a determination can be made to escalate the support request beyond the embedded knowledgebase in the consumer appliance. Specifically, based upon the support request and the amount of interaction between the querying user and the embedded knowledgebase, a decision can be made to escalate the support request by way of e-mail, instant message or voice chat. For example, a rules engine or a table can be used to lookup a desired escalation. In any event, in block 350 the support request can be escalated and in block 360, it can be determined whether or not the support request has failed without recourse to additional escalation. If not, the process can return to decision block 330 to determine whether the support request has been resolved. If so, in block 370 the issue for the support request and the resolution can be logged and reported to the aggregated knowledgebase in block 380.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable storage medium can be any apparatus that can contain, store or communicate the program for use by or in connection with the instruction execution system, apparatus, or device. The medium can be an electronic, magnetic, optical, electromagnetic, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. An embedded multi-channel knowledgebase data processing system configured for embedded product support, the system comprising:
   a consumer appliance including memory and a processor;
   a knowledgebase embedded in the consumer appliance, the knowledgebase being a passive database configured to be accessible by a help module executing in memory of the consumer appliance only when a support request is received through the consumer appliance;
   the help module disposed in the consumer appliance and programmed to receive a support request from an end user through the consumer appliance and to query access to the knowledgebase in the consumer appliance to answer the support request from within the consumer appliance; and
   multi-channel escalation and reporting logic executing in memory of the consumer appliance and coupled to the help module, the multi-channel escalation and reporting logic comprising program code enabled to escalate the support request to a remote communicatively coupled response manager over a selected channel through a computer communications network upon determining that the support request remains unresolved, wherein the escalated support request includes status information for the consumer appliance, further wherein the status information includes a visualization of the consumer appliance so as to permit the response manager to visualize a problem experienced by the end user, and wherein the selected channel is selected from the group consisting of e-mail, instant messaging and voice chat, wherein the e-mail channel is selected if the support request is for a first level of support, the instant messaging channel is selected if the support request is for a second level of support, the second support level being higher than the first support level, and the voice chat channel is selected if the support request level is for a third level of support, the third support level being higher than both the first support level and the second support level.

2. The system of claim 1, further comprising an aggregator communicatively coupled to the consumer appliance, the aggregator aggregating support request information in an aggregated knowledgebase accessible by multiple different communicatively coupled consumer appliances over the computer communications network.

3. The system of claim 1, wherein the consumer appliance is a copier.

4. The system of claim 1, wherein the consumer appliance is a cellular telephone.

5. The system of claim 1, wherein the response manager is disposed in a computing device in a call center.

6. The system of claim 1, wherein the program code to escalate the support request to the remote communicatively coupled response manager is determined based upon the support request and an amount of interaction between the end user and the knowledge base.

7. A method for embedded multi-channel escalation and reporting, the method comprising:
receiving, by a help module executing in memory of a consumer appliance, a support request from an end user through the consumer appliance, the consumer appliance including memory and a processor;
querying, by the help module disposed in the consumer appliance, access to a knowledgebase in the consumer appliance to answer the support request from within the consumer appliance, the knowledgebase being a passive database configured to be accessible by the help module only when the support request is received through the consumer appliance; and
escalating, by multi-channel escalation and reporting logic executing in memory of the consumer appliance and coupled to the help module, the support request to a remote communicatively coupled response manager over a selected channel through a computer communications network upon determining that the support request remains unresolved, wherein the escalated support request includes status information for the consumer appliance, further wherein the status information includes a visualization of the consumer appliance so as to permit the response manager to visualize a problem experienced by the end user, and wherein the selected channel is selected from the group consisting of e-mail, instant messaging and voice chat, wherein the e-mail channel is selected if the support request is for a first level of support, the instant messaging channel is selected if the support request is for a second level of support, the second support level being higher than the first support level, and the voice chat channel is selected if the support request level is for a third level of support, the third support level being higher than both the first support level and the second support level.

8. The method of claim 7, further comprising logging the support request over the computer communications network in an aggregated knowledgebase.

9. The method of claim 7, wherein escalating the support request to the remote response manager is based upon the support request and an amount of interaction between the end user and the knowledgebase.

10. A knowledge management computer program product comprising a non-transitory computer usable storage medium embodying computer usable program code for embedded multi-channel escalation and reporting, the computer program product comprising:
a help module disposed and executable in memory of a consumer appliance comprising computer usable program for receiving a support request from an end user through the consumer appliance, the consumer appliance including memory and a processor;
the helper module further comprising computer usable program code for querying access to a knowledgebase embedded in the consumer appliance to answer the support request from within the consumer appliance, the knowledgebase being a passive database configured to be accessible by the help module only when the support request is received through the consumer appliance; and
multi-channel escalation and reporting logic executable in memory of the consumer appliance and coupled to the help module comprising computer usable program code for escalating the support request to a remote communicatively coupled response manager over a selected channel through a computer communications network upon determining that the support request remains unresolved, wherein the escalated support request includes status information for the consumer appliance, further wherein the status information includes a visualization of the consumer appliance so as to permit the response manager to visualize a problem experienced by the end user, and wherein the selected channel is selected from amongst an e-mail channel, an instant messaging channel and a voice chat channel according to a level of escalation, wherein the e-mail channel is selected if the support request is for a first level of support, the instant messaging channel is selected if the support request is for a second level of support, the second support level being higher than the first support level, and the voice chat channel is selected if the support request level is for a third level of support, the third support level being higher than both the first support level and the second support level.

11. The computer program product of claim 10, further comprising computer usable program code for logging the support request over the computer communications network in an aggregated knowledge base.

12. The computer program product of claim 10, wherein the computer usable program code for escalating the support request to the remote response manager is based upon the support request and an amount of interaction between the end user and the knowledgebase.

* * * * *